United States Patent
Doering et al.

(10) Patent No.: US 8,371,180 B2
(45) Date of Patent: Feb. 12, 2013

(54) MICROMECHANICAL SENSOR ELEMENT FOR CAPACITIVE DIFFERENTIAL PRESSURE DETECTION

(75) Inventors: Christian Doering, Stuttgart (DE); Remigius Has, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 189 days.

(21) Appl. No.: 13/023,855

(22) Filed: Feb. 9, 2011

(65) Prior Publication Data
US 2011/0192236 A1 Aug. 11, 2011

(30) Foreign Application Priority Data

Feb. 11, 2010 (DE) .......................... 10 2010 001 797

(51) Int. Cl.
*G01L 1/00* (2006.01)
(52) U.S. Cl. .................................................. 73/862.68
(58) Field of Classification Search ................ 73/862.68
See application file for complete search history.

(56) References Cited

U.S. PATENT DOCUMENTS

| | | | | |
|---|---|---|---|---|
| 3,149,488 A | * | 9/1964 | Castro .......................... | 73/862.68 |
| 3,341,795 A | * | 9/1967 | Smith et al. ........................ | 338/5 |
| 5,379,653 A | * | 1/1995 | Saner ........................... | 73/862.59 |
| 6,369,435 B1 | * | 4/2002 | Igel ............................... | 257/415 |
| 8,220,337 B2 | * | 7/2012 | Has ................................ | 73/718 |

* cited by examiner

*Primary Examiner* — Lisa Caputo
*Assistant Examiner* — Octavia Davis-Hollington
(74) *Attorney, Agent, or Firm* — Kenyon & Kenyon LLP

(57) ABSTRACT

A sensor concept for capacitive pressure measurement yields reliable measurement results and is for aggressive particle-bearing measuring environments. This sensor element is a micromechanical sensor element, whose structural elements are implemented in a layered structure. The sensor element includes two pressure connections separated from each other, a deflectable carrier element for at least one deflectable measuring electrode, and at least one stationary counter electrode for the measuring electrode. The carrier element spans a closed cavity in the layered structure. The carrier element is spanned by a cap structure, and is suspended on the cap structure via a suspension web functioning as a rocker bearing. The two pressure connections are connected to the carrier element's top side which is divided by the suspension web into two separated pressure connection zones. The measuring electrode is on the carrier element's underside and the counter electrode is on the cavity's opposite wall.

9 Claims, 2 Drawing Sheets

MICROMECHANICAL SENSOR ELEMENT FOR CAPACITIVE DIFFERENTIAL PRESSURE DETECTION

RELATED APPLICATION INFORMATION

The present application claims priority to and the benefit of German patent application no. 10 2010 001 797.3, which was filed in Germany on Feb. 11, 2010, the disclosure of which is incorporated herein by reference.

FIELD OF THE INVENTION

The present invention relates to a micromechanical sensor element for capacitive differential pressure detection, whose structure elements are implemented in a layered structure. The sensor element includes two pressure connections which are separated from each other, a deflectable carrier element for at least one deflectable measuring electrode, and at least one stationary counter electrode for the measuring electrode.

BACKGROUND INFORMATION

Pressure sensors having micromechanical sensor elements are used today in machine construction, process engineering, automotive engineering, and medical technology for diverse measuring tasks. Differential pressure sensors are used to compare pressures that prevail in two chambers or media that are separated from each other. The media being measured may be liquids, gases, or even vapors.

A typical use of micromechanical differential pressure sensors in automotive engineering is comparing the exhaust gas pressure upstream and downstream from the particulate filter. Since very high and greatly variable absolute pressures occur here and the exhaust gases form an aggressive particulate-bearing measuring environment, there are increased demands on the dynamics and ruggedness of the sensor element in regard to its micromechanical structure, but also in regard to signal detection.

One possibility for differential pressure determination is detecting the two measured pressures to be compared with the aid of two independent absolute pressure sensors and then calculating the difference between the measured values thus obtained. In practice, however, this method usually does not yield satisfactory results. The reason for this is found in the insufficient measuring accuracy of the generally available absolute pressure measuring devices, which is not adequate to determine the pressure difference with sufficient accuracy, in particular in the case of wide pressure ranges and/or high absolute pressures but small differential pressures.

SUMMARY OF THE INVENTION

With the exemplary embodiments and/or exemplary methods of the present invention, a sensor concept for capacitive differential pressure measurement is proposed, which yields very reliable measurement results and is also suitable for use in aggressive particle-bearing measuring environments.

According to the exemplary embodiments and/or exemplary methods of the present invention, the carrier element for the measuring electrode spans a closed cavity in the layered structure. The carrier element itself is spanned by a cap structure, on which it is suspended via a suspension web. The latter functions as a rocker bearing for the carrier element. Both pressure connections of the sensor element according to the present invention are connected to the top of the carrier element, which top is divided by the suspension web into two pressure connection zones separated from each other. The at least one measuring electrode is situated on the underside of the carrier element, while the at least one counter electrode is situated on the opposite wall of the cavity.

It is essential for the sensor concept according to the present invention that the measuring capacitor is located within a cavity in the sensor structure which is closed off, by the carrier element for the measuring electrode, from the medium being measured. In this way, the capacitor electrodes and the capacitor structure are optimally protected from the attack by aggressive media being measured and from soiling by particles in the medium being measured. According to the present invention, the pressure is applied exclusively to the top of the carrier element, which is suspended on a cap structure of the sensor element like a swash plate. Since the two measured pressures are routed to two pressure connection zones separated from each other by the suspension web, a pressure difference results in a corresponding tilting of the carrier element.

The deflection of the carrier element may be detected simply, both qualitatively and quantitatively, with the aid of the measuring capacitor. The sensitivity of the sensor element according to the present invention is largely determined in this case by geometric parameters of the sensor structure, such as the wall thickness and length of the suspension web and the distance between the electrodes of the measuring capacitor when at rest. In this connection, it proves to be advantageous that the sensor structure does not have to be designed for the particular pressure range of the individual measured pressures p1 and p2, but may be adjusted to the range of fluctuation of the pressure difference |p1-p2| between the measured pressures p1 and p2 being compared. That enables even small pressure differences at high absolute pressures to be detected reliably.

In principle, there are various design options for the individual structural elements of the sensor element according to the present invention within the framework of the underlying sensor concept. Accordingly, the carrier element must on the one hand be deflectable, and on the other hand it must hermetically seal off the cavity in which the measuring capacitor is situated. To that end, the carrier element may be implemented simply, for example in the form of a closed diaphragm. In a particularly advantageous variant, however, only the edge area of the carrier element has a diaphragm-like form, while the middle area is stiffened like a plate. Situating the measuring electrode in the stiffened area of the carrier element prevents the measuring electrode from becoming additionally deformed, which could result in the measurement signal being too highly dependent on the absolute pressure.

In regard to simple measurement signal detection and evaluation, it also proves to be advantageous if the suspension web divides the carrier element into two essentially equal-sized pressure connection zones.

As mentioned earlier, the carrier element is connected to a cap structure via a suspension web which spans the carrier element. In an advantageous refinement of the sensor structure according to the present invention, this rocker-bearing support of the carrier element is supplemented by a support web, which is situated on the underside of the carrier element opposite the suspension web and connects the carrier element to the cavity wall. The support of the carrier element is stabilized additionally by this support web.

The sensor structure according to the present invention may be equipped with one or with several measuring capacitors. In any case, the arrangement and flat area of the measuring electrode of a measuring capacitor should be limited to one of the two pressure connection zones of the carrier element, in order to obtain unambiguous sensor signals.

The failure-safety and reliability of the sensor element according to the present invention may be increased easily by providing mutually independent measuring capacitors for both pressure connection zones.

Corresponding to its function, differential pressure measurement, the sensor element according to the present invention includes two pressure connections separated from each other. These pressure connections may pass independently of each other, either through the cap structure or else, starting from the back side of the component, and under the cap structure to the top side of the carrier element. The arrangement and form of the pressure connections is decisively determined by the use and the location of the sensor element.

If the pressure connection is formed on one side in the cap structure, i.e., on the top side of the component, then the sensor element according to the present invention may be of monolithic construction; that is, the micromechanical structural elements may integrated together with electronic circuit elements for signal processing on a chip.

According to another refinement, it is provided that the sensor has an electronic oscillating circuit, the electronic oscillating circuit may include a coil and an electronic capacitor in the form of the first and second electrodes. A change in the electronic capacitance then causes a shift in the resonant frequency of the electronic oscillating circuit, which may be read out wirelessly. This is done for example with the aid of an external electromagnetic field, which is excited by an external coil and supplies the oscillating circuit of the sensor with energy and makes it possible to determine the resonant frequency of the sensor.

Advantageously, no electric connecting lines are necessary here to read the sensor, so that damage to such lines by aggressive media for example in the pressure chambers is avoidable.

There are various possibilities for developing and refining the teaching of the present invention advantageously, as already explained above. To that end, we refer on the one hand to the claims subordinate to independent claim 1, and on the other hand to the following description of two exemplary embodiments of the present invention based on the figures.

DETAILED DESCRIPTION

Figure 1:
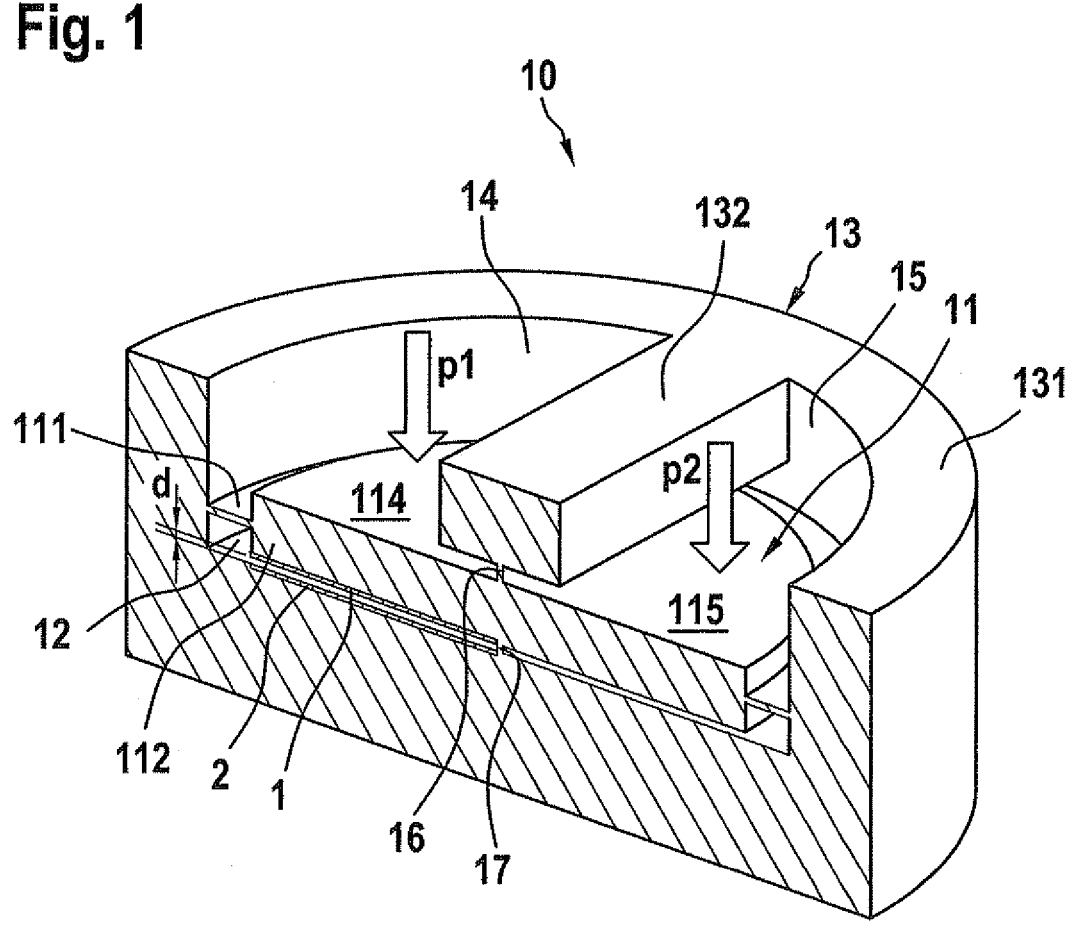
FIG. 1 shows a perspective cross-sectional view of a first sensor element 10 according to the present invention for differential pressure detection, having pressure connection apertures situated on one side.

The sensor structure of micromechanical sensor element 10 for differential pressure detection depicted in FIG. 1 is implemented in a layered structure, the layers of which are not designated individually here for the sake of overall clarity.

The sensor structure includes a deflectable carrier element 11, which spans a cavity 12 in the layered structure and seals it hermetically. In the exemplary embodiment described here, a ring-shaped edge area 111 of carrier element 11 is of diaphragm-like design, while middle area 112 of carrier element 11 is stiffened and significantly thicker. Accordingly, when carrier element 11 is deflected, only its edge area 111 is deformed.

Over carrier element 11 is a cap structure 13. In the present case, both pressure connection apertures 14 and 15 for the measured pressures p1 and p2 to be compared are formed in cap structure 13. Cap structure 13 is therefore made up only of a ring-shaped cap rim 131, which is connected to the layered structure, and a middle bar 132 which spans carrier element 11.

Carrier element 11 is connected to middle bar 132 of cap structure 13 via a very thin suspension web 16. Suspension web 16 extends over the entire length of middle bar 132. It forms a partition between the pressure connections for the two measured pressures p1 and p2, and divides carrier element 11 into two pressure connection zones 114 and 115. On the underside of carrier element 11, opposite suspension web 16, is an equally thin support web 17, through which carrier element 11 is connected to the floor of cavity 12. Suspension web 16 together with support web 17 forms a rocker bearing for carrier element 11.

The two pressures to be measured p1 and p2 are conducted via pressure connection apertures 14 and 15 in cap structure 13 to the top side of carrier element 11, specifically to pressure connection zones 114 and 115.

Signal detection occurs capacitively, here with the aid of a measuring capacitor, whose electrodes 1 and 2 are situated according to the present invention inside cavity 12. Measuring electrode 1 is located on the underside of carrier element 11, and is limited to one pressure connection zone. Stationary counter electrode 2 is situated on the opposite wall of the cavity. The process technology for producing the capacitor electrodes may use local dopings, for example, which are isolated from the surrounding semiconductor substrate by oxide sections, or else structured surface profiles. To prevent short-circuiting of the capacitor electrodes in the event of contact, at least one of the two electrode surfaces may be provided with an insulating layer.

If pressures p1 and p2 are equal to zero or are identical, then either no pressure forces are acting on carrier element 11 or the forces acting on the two pressure connection zones 114 and 115 cancel out each other. In that case carrier element 11 is in its rest position, and there is a distance d, defined by the sensor design, between measuring electrode 1 and counter electrode 2. This distance d determines the value of output capacitance C0 of the measuring capacitor, together with the layout of the two electrodes 1 and 2.

If the two pressures p1 and p2 differ, then different forces are acting on the two pressure connection surfaces 114 and 115, and carrier element 11 is deflected from its rest position. Because of its suspension on cap structure 13, carrier element 11 is tipped according to the pressure difference between p1 and p2. That changes the distance d between measuring electrode 1 and counter electrode 2, and consequently also the capacitance of the measuring capacitor.

If p1 is greater than p2, then distance d is reduced, which results in an increase in capacitance. Conversely, electrode interval d increases when p1 is less than p2, which results in lowering the capacitance of the measuring capacitor. The direction of the pressure gradient between p1 and p2 is thus easily determinable on the basis of the algebraic sign of the change in capacitance.

Figure 2:
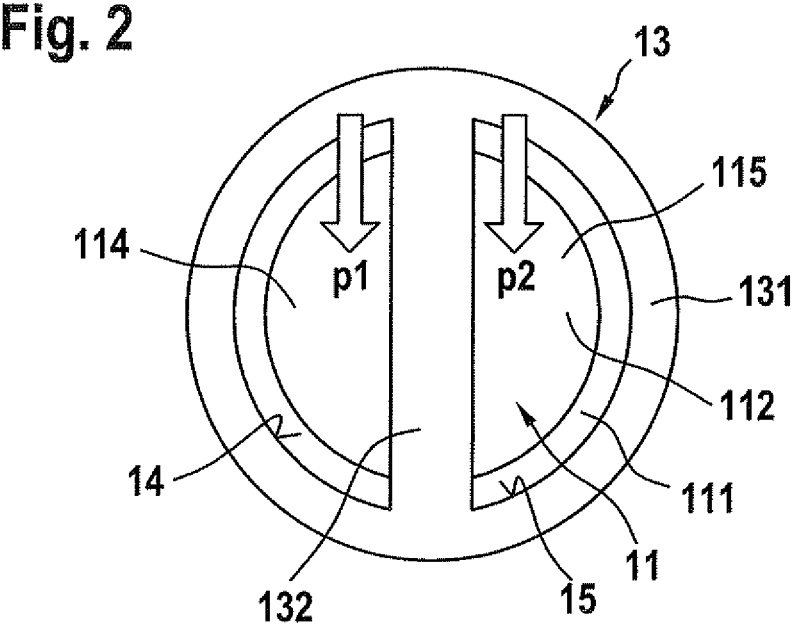
FIG. 2 shows a top view of the top side of sensor element 10.

FIG. 2 illustrates the geometry of cap structure 13, which spans carrier element 11. Ring-shaped cap rim 131 site on the layered structure of the sensor structure and surrounds the diaphragm-like edge area 111 of carrier element 11. Formed in cap structure 13 are the two pressure connection apertures 14 and 15, which are separated by middle bar 132. The two pressure connection apertures 14 and 15 are the same size, and have the shape of a secant circle segment. They each extend over the diaphragm-like edge area 111 and the stiffened middle area 112 of a pressure connection surface 114 or 115 of carrier element 11.

Since pressure connection apertures 14 and 15 are both formed here in cap structure 13, i.e., in the surface of the component, the structure of sensor element 10 is producible exclusively using methods of surface micromechanics, i.e., without processing of the back side. This way of processing makes it possible to integrate circuit elements for signal processing onto the micromechanical sensor chip and thereby to achieve a monolithic sensor chip having the sensor structure according to the present invention.

Figure 3:
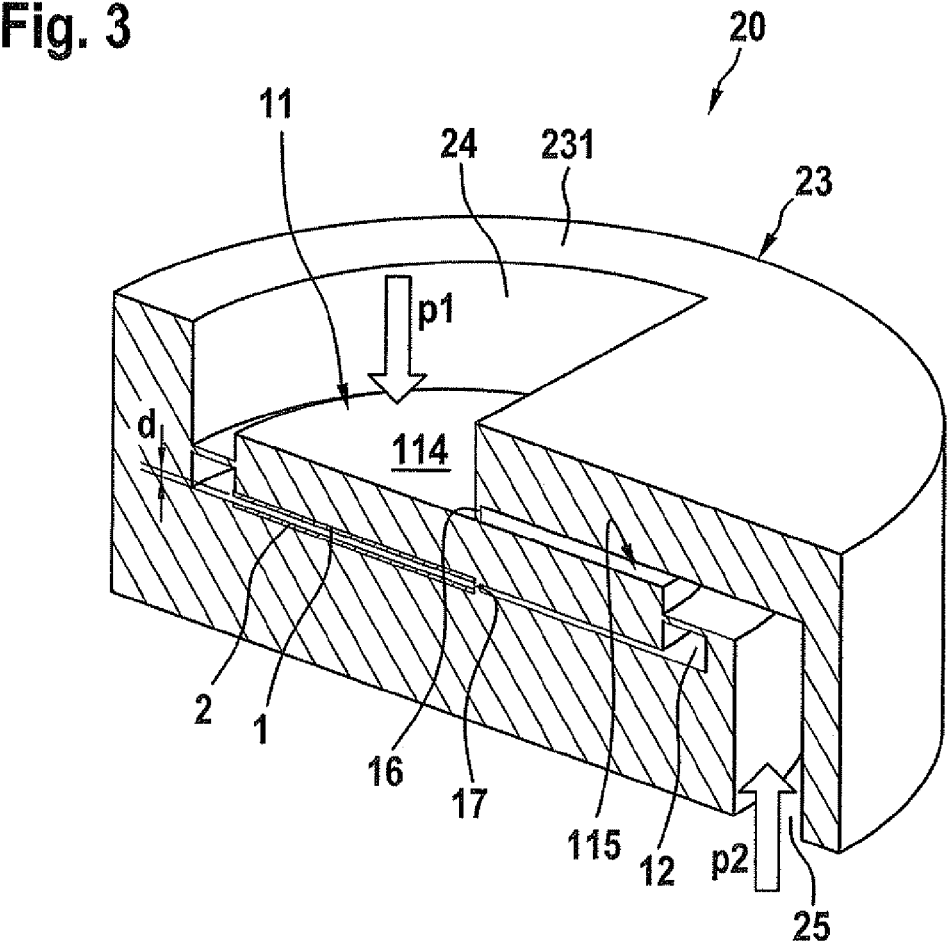
FIG. 3 shows a perspective cross-sectional view of a second sensor element 20 according to the present invention for differential pressure detection, having pressure connection apertures situated on two sides.

FIG. 3 shows a sensor element 20 for differential pressure detection, whose sensor structure corresponds to the sensor structure of sensor element 10 depicted in FIG. 1, except for the cap structure and the arrangement of the pressure connection apertures. The same structural and functional elements are therefore designated by the same reference numerals. Also see the description for FIG. 1 with regard to the manner of functioning of sensor element 20.

In contrast to sensor element 10, in which both pressure connections are routed through cap structure 13, in the case of sensor element 20 only one pressure connection aperture 24 is formed in cap structure 23. This pressure connection aperture 24 is located above pressure connection surface 114 of carrier element 11, and is delimited on one side by ring-shaped cap rim 231 and on the other side by suspension web 16, through which carrier element 11 is connected to cap structure 23. Cap structure 23 is closed via the other pressure connection surface 115 of carrier element 11. Second pressure connection aperture 25 of sensor element 20 is situated in the back side of the component, to the side of cavity 12, and is connected to a point under the closed half of cap structure 23. Since here, as also in the case of sensor element 10, both measured pressures p1 and p2 are connected to the top side of carrier element 11, both sensor elements 10 and 20 are based on the same measurement principle.

Figure 4A:
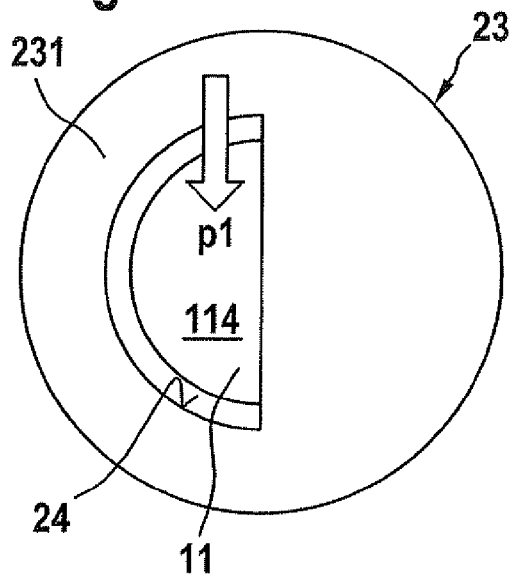
FIG. 4a shows a top view of the top side of sensor element 20.

FIG. 4a illustrates the geometry of cap structure 23, which spans carrier element 11 of sensor element 20. In the one half of the cap structure above the one pressure connection surface 114 of carrier element 11, pressure connection aperture 24 is situated. The other half of cap structure 23 is closed. This half spans the other pressure connection surface 115 of carrier element 11, which is not visible however in the top view of FIG. 4a.

Figure 4B:
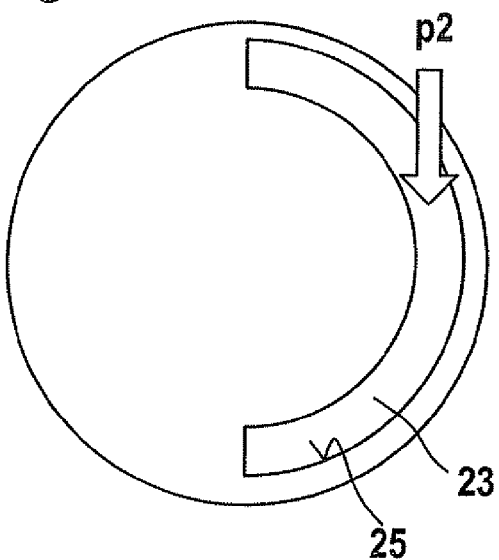
FIG. 4b shows a top view of the back side of sensor element 20.

The geometry and arrangement of second pressure connection aperture 25 of sensor element 20 is illustrated by the top view of the back side of the component depicted in FIG. 4b. In the exemplary embodiment depicted here, pressure connection aperture 25 is shaped in the form of a half-ring and is situated at the outer circumference of pressure connection surface 115. It opens into the intermediate space between cap structure 23 and carrier element 11.

The arrangement of the pressure connection apertures depends essentially on the use, and on the space conditions at the location where the sensor element according to the present invention is employed. Thus under certain boundary conditions the two-sided pressure connection proves to be advantageous, while in other cases the one-sided pressure connection may be used. Forms of implementation having a lateral pressure connection may also be implemented.

What is claimed is:

1. A micromechanical sensor element for providing capacitive differential pressure detection, whose structural elements are implemented in a layered structure, comprising:
    two pressure connections that are separated from each other;
    a deflectable carrier element for at least one deflectable measuring electrode;
    at least one stationary counter electrode for the measuring electrode;
    wherein the carrier element spans a closed cavity in the layered structure,
    wherein the carrier element is spanned by a cap structure,
    wherein the carrier element is suspended on the cap structure via a suspension web functioning as a rocker bearing,
    wherein the two pressure connections are connected to the top side of the carrier element, which is divided by the suspension web into two pressure connection zones which are separated from each other, and
    wherein the at least one measuring electrode is situated on the underside of the carrier element and the at least one counter electrode is situated on the opposite wall of the cavity.

2. The sensor element of claim 1, wherein the carrier element has a stiffened middle area and the edge area of the carrier element is of diaphragm-like configuration.

3. The sensor element of claim 1, wherein the suspension web divides the carrier element into two pressure connection zones of essentially equal size.

4. The sensor element of claim 1, wherein on the underside of carrier element, situated opposite the suspension web, a support web is formed, through which the carrier element is connected to the cavity wall.

5. The sensor element of claim 1, wherein the arrangement and flat area of the at least one measuring electrode is limited to one of the two pressure connection zones of the carrier element.

6. The sensor element of claim 1, further comprising:
    measuring capacitors that are independent of each other for both pressure connection zones.

7. The sensor element of claim 1, wherein at least one of the two pressure connections passes through the cap structure.

8. The sensor element of claim 1, wherein at least one of the two pressure connections passes, starting from the back side of the component, under the cap structure and onto the top side of the carrier element.

9. The sensor element of claim 1, further comprising:
    an inductive detection arrangement for providing inductive detection of the resonant frequency of the oscillating circuit;
    wherein the at least one measuring electrode and the corresponding counter electrode are connected together by a coil to form an oscillating circuit.

* * * * *